Patented May 15, 1945

2,376,213

UNITED STATES PATENT OFFICE 2,376,213

PHENOL-FORMALDEHYDE RESIN

John E. Watson, Detroit, and Keith A. Binder, Dearborn, Mich., assignors to Ford Motor Company, Dearborn, Mich., a corporation of Delaware No Drawing. Application December 17, 1941, Serial No. 423,316

2 Claims. (Cl. 260—58)

This invention concerns a resin of the phenol-aldehyde group, readily miscible in water and particularly adapted for use as a varnish or binder for electrical coils, fibers, and like uses.

An object of this invention is to obtain a stabilized phenol-aldehyde water-soluble resin which, when dried, forms a hard, adherent and mechanically resistant body having superior dielectric characteristics.

It is well known that phenol and formaldehyde react under suitable conditions to form a resinous condensation product. If the condensation is not carried to completion, the product is soluble in organic solvents and initially may be diluted with water without precipitating. Heretofore, this initial water dilution factor of a phenol-formaldehyde resin was lost on ageing. At best, the dilution factors of the above-mentioned partial condensates or so-called water-soluble resins were markedly poor, very seldom reaching a dilution of two parts of water to one part of resin without precipitation of the resin.

It is, therefore, another object of this invention to provide a method and procedure for compounding phenol-aldehyde resins having permissive dilution factors ranging from 5 to 7 parts of water to one part of resin up to resins which may be infinitely diluted with water. These resins, in aqueous solutions will display the characteristics of true solutions even after having aged for several months. That is to say, there will be no precipitation of resin or sediment after long ageing periods and the solution may be used at any time with uniform results. One must keep in mind that even though our partially condensed resins are characterized by high dilutions, when converted or condensed to their final form they are insoluble and infusible. Under these conditions the condensed resin has a very low water absorption.

Whereas resins formerly required many hours of cooking, production of our resin may be accomplished from between 2 to 6 hours. This, of course, reduces the cost of production by reducing cost and size of equipment or increasing capacity of production per unit time. Another great saving is realized from the solvent inasmuch as water replaces the more expensive organic diluents or solvents.

Uses for water-phase phenolics are varied and they may be employed in many places where for reasons of safety or prohibitive cost, phenolics soluble only in organic solvents are unavailable. The term "phenolics," as referred to herein, covers those resins that are formed by the reaction of phenol and its homologs, aldehydes and other ingredients. We have found that our water-phase phenolic, for example, can be employed with excellent results as a varnish for electrical coils or as a binder for resin-fiber plastics. These and other specific applications will be described more fully later.

In general, the resinous material is compounded according to the following proportional ranges:

1 mol of phenol or a homolog
1.0–1.9 of an aldehyde
1–20% by weight of a polyhydroxy alcohol based on weight of phenol
.5–10% by weight of a catalyst based on weight of phenol The following ranges are illustrative of the above:

| | Grams |
|---|---|
| Phenol | 700 |
| Formalin | 700 to 1,000 |
| A polyhydroxy alcohol | 20 to 150 |
| Alkali metal hydroxide | 3.5 to 30 |

As a further illustration of specific mixtures, together with time and temperature conditions, the following five examples are typical:

A

| | Grams |
|---|---|
| Phenol | 700 |
| Formalin | 700 |
| Glycerin | 100 |
| KOH or NaOH | 21 |

Reflux for 2½ hours at 65°–70° C. The resin thus formed will have a nonvolatile content (N. V. C.) of approximately 54%. This resin is infinitely soluble in water.

B

| | Grams |
|---|---|
| Phenol | 700 |
| Formalin | 700 |
| Glycerin | 70 |
| KOH or NaOH | 21 |

This resin is made by refluxing while boiling the reactants for about 5 minutes, cooling the mixture to 90°–95° C. and reacting the mixture for 15 minutes at this temperature. The maximum dilution factor of this resin is about 1 part of resin to 5 parts of water.

C

| | Grams |
|---|---|
| Phenol | 700 |
| Formalin | 700 |
| Pentaerythritol | 35 |
| KOH or NaOH | 21 |

This mixture is refluxed at 65°–70° C. for 2 hours and results in N. V. C. of about 50% and a dilution factor of 1 part of resin to 20 parts of water.

D

| | Grams |
|---|---|
| Phenol | 700 |
| Formalin | 700 |
| Glycerin | 35 |
| KOH or NaOH | 21 |

Reflux for 1 hour at 65°–70° C. and add 235 c. c. of water 50°–55° C. Continue refluxing for 40 minutes. This resin is infinitely water soluble, having N. V. C. of 42%.

E

| | Grams |
|---|---|
| Phenol | 700 |
| Formalin | 835 |
| Glycerin | 37 |
| KOH or NaOH | 22 |

Reflux for 2½ hours at 75°–80° C. This resin has a dilution factor of 1 part of resin to 7 parts of water and N. V. C. of about 50%.

Examples A and C employ two distinct polyhydroxy alcohols to obtain the same result. The alcohol pentaerythritol, $C(CH_2OH)_4$, seems to yield better dilution factors per amounts used.

Example D utilizes a special procedure for obtaining a high dilution factor, but with this method the N. V. C. is less than 50%. It will be noticed that D is a two-step resin, i. e., the reaction is interrupted to introduce a given amount of water and then continued to form the above resin. In this manner, infinite solubility may be had with a slight drop in N. V. C.

Another method of producing better water dilution factors, as in Example E, is to use a greater amount of formalin. With this method, however, there is an excess of formalin which is very irritating to the workers as the formaldehyde escapes from solution. Moreover, if too great amount of formalin is used, the baked varnish will tend to blister and therefore render the finish undesirable.

It has been found that the reactions are more easily controlled if the mixture is brought slowly to refluxing temperature. One possible explanation may be that the reaction is exothermic after it has reached the reaction temperature, which seems to be especially true in large batches of 200 gallons or more. A temperature rise of about 2° F. for every 5 minutes has been found convenient to produce a resin with the proper reaction.

From the sample resins listed, it is evident that their formation depends largely on the control of time and temperature of reaction. As a general rule, the necessary catalyst is added to the formalin, followed by the glycerin or other polyhydroxy alcohol, and to this mixture phenol is then added. However, this routine may be changed, such as reacting the catalyst with the alcohol and adding this to the formalin, followed by the phenol. The solubility curve of a resin may be altered as in example D by using a two-step reaction. Thus, predetermined portions of either glycerin or phenol may be purposely held in reserve to be added to the reacting resin after a given time.

In the above formulas, glycerin and pentaerythritol are specifically described; but other polyhydroxy alcohols also give somewhat similar results. We have found that the addition of these alcohols provides several distinct advantages as compared to phenol-formaldehyde resins made without alcohol. They increase the water dilution factor of the above-described resins. Formerly, where an equal amount of water would precipitate the resin, when glycerin is added, the dilution factor increases to more than 20 parts of water to 1 part of resin. For all practical purposes this may be considered as infinitely soluble.

Another feature of glycerin is that it provides a stabilizing action to keep the resin in solution for longer periods of time and also aids the resin to maintain its solubility after long storage periods. Formerly, phenolic resins upon storage would lose most of their water solubility and, in many cases, would become precipitated because of their instability. Still another feature of glycerin is its plasticizing action on the phenolic resin. This quality is more pronounced when this resin is used as a binder in molding of laminated or pulp preforms to produce hard, pressure resisting panels. The use of this resin in the above capacity is only made possible by the high water dilution factor, for it is desirable to have slurry of fiber and diluted resin solutions in which the resin content is about 2% to 15%.

We have also used this resin for impregnating generator armatures with results that exceeded those of a spirit resin varnish. The wires forming the coil may be coated with an enamel and covered with paper or textile or other materials which have to be treated so that dielectric properties are imparted to them. It has been suggested that the paper or textile covered wires be impregnated before winding the coils. This might be possible if it were not for two obstacles. One of these is that varnishes have a tendency toward brittleness, which is an undesirable characteristic inasmuch as coils today are machine-wound and the wires are flexed, which might rupture the coating, losing whatever qualities were gained by the impregnation. The other obstacle is that some coils, such as generator armature coils, are subjected to fairly high centrifugal force that tends to throw the wiring outwardly and thereby cause wear, resulting in subsequent failures. For these reasons, it has been found best to impregnate the coils after they have been assembled on their supports. Impregnation of the armature is accomplished in only 1½ minutes at room temperature with resin having the following properties. The resin solution in this case was diluted to 45% N. V. C., having specific gravity of 1.12 to 1.13 at 15.5° C., and a viscosity of 20 seconds in a #3 Ford cup at 27° C. Since impregnation requires only 1½ minutes without a static head, vacuum, or pressure system, the impregnating bath may be simplified to a shallow pan whose length will depend on the speed of the conveyor line. Formerly, dipping resins had poor wetting and penetrating qualities which required time and pressure for good impregnation. Our successful impregnation is attributed to the water-phase phenolics which are practically water thin while having high N. V. C., and which do not merely coat the paper or fiber covered wire, but also penetrate to the very cells of the coverings. This is made possible by wetting ability, capillary action and by the fact that the resin forms a solution and not merely a dispersion.

Likewise, much time can also be saved in the drying or baking operation since curing of our resin can be accomplished in a shorter time. Curing time of our resin is 2½–4 hours, as compared to 5–12 hours for other varnishes at 120°–125° C.; in fact, if an infrared drying system is used, the time for curing our resin is only 25–30 minutes.

As a rule, oil-resin varnishes form coatings that are more flexible than those of phenol-formaldehyde types. This might seem to be a disadvantage of the synthetic resin varnishes, but on the contrary it is an advantage. In the case of a generator armature whose speed may attain 6000–9000 R. P. M., it is evident that with each start and stop the centrifugal force will rise and fall, causing movement in any flexible wire so that the protective coating is worn off. Our water-phase phenolic bakes with little resiliency but the bond between each wire is very tough so that movement of the wires is at a minimum. Tests run on water-soluble phenolic impregnated armatures indicate the adhesiveness of this resin to be excellent since the armatures have been run at 12,000 R. P. M.

Some changes may be made in the various ingredients and their proportions used in our improved water-phase resin without departing from the spirit of our invention, and it is our intention to cover by our claims such changes as may reasonably be included within the scope thereof.

We claim as our invention:

1. A composition of matter comprising a synthetic resin, partially condensed in an aqueous solution and capable of further dilution to in excess of 5 parts of water to 1 part of resin without precipitation of said resin, formed by refluxing at 65–70° C. for 2 hours equal amounts of phenol and formalin, 5% pentaerythritol by weight based on the weight of phenol, and 3% of an alkali metal hydroxide catalyst by weight based on the weight of phenol.

2. A partially condensed synthetic resin having the characteristic of being soluble in water and capable of remaining in aqueous solution in dilution in excess of five parts of water to one part of resin, said resin formed by the reaction of the following essential components in substantially the proportions shown:

| | Grams |
|---|---|
| Phenol | 700 |
| Formalin | 700 to 1,000 |
| Pentaerythritol | 20 to 150 |
| Alkali metal hydroxide | 3.5 to 30 | said resin being subject to complete condensation on heating to form an insoluble and infusible resin.

JOHN E. WATSON.
KEITH A. BINDER.